(12) United States Patent
Dandoko et al.

(10) Patent No.: US 11,588,946 B2
(45) Date of Patent: Feb. 21, 2023

(54) DISPLAY APPARATUS THAT DISPLAYS SCROLL BAR IN DISPLAYED PORTION OF OPERATION SCREEN REDUCED BY SUPERIMPOSED KEYBOARD, AND IMAGE FORMING APPARATUS

(71) Applicant: KYOCERA Document Solutions Inc., Osaka (JP)

(72) Inventors: Takushi Dandoko, Osaka (JP); Yoshitaka Matsuki, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/665,946

(22) Filed: Feb. 7, 2022

(65) Prior Publication Data
US 2022/0286569 A1    Sep. 8, 2022

(30) Foreign Application Priority Data
Mar. 2, 2021   (JP) .............................. JP2021-032653

(51) Int. Cl.
*H04N 1/00*        (2006.01)
*G06F 3/04855*     (2022.01)
*G06F 3/04886*     (2022.01)

(52) U.S. Cl.
CPC ..... *H04N 1/00506* (2013.01); *G06F 3/04855* (2013.01); *G06F 3/04886* (2013.01); *H04N 1/00411* (2013.01); *G06F 2203/04803* (2013.01)

(58) Field of Classification Search
None
See application file for complete search history.

(56) References Cited

U.S. PATENT DOCUMENTS

| | | | | |
|---|---|---|---|---|
| 5,572,647 | A * | 11/1996 | Blades | G09G 5/14 715/798 |
| 6,157,381 | A * | 12/2000 | Bates | G09G 5/14 715/786 |
| 2002/0080157 | A1* | 6/2002 | Chickles | G06F 8/38 715/700 |
| 2012/0311509 | A1* | 12/2012 | Maggiotto | G06F 3/04817 715/863 |
| 2014/0118782 | A1 | 5/2014 | Tamai et al. | |
| 2015/0067513 | A1* | 3/2015 | Zambetti | G06F 3/0488 715/771 |
| 2017/0060404 | A1* | 3/2017 | Salituri | G06F 3/0481 |
| 2018/0004546 | A1* | 1/2018 | Ferras Pereira | G06F 3/0227 |
| 2020/0236248 | A1* | 7/2020 | Usui | G06F 3/0488 |

FOREIGN PATENT DOCUMENTS

JP    2014-074981 A    4/2014

* cited by examiner

*Primary Examiner* — Daniel Rodriguez
*Assistant Examiner* — Gabriel Mercado
(74) *Attorney, Agent, or Firm* — IP Business Solutions, LLC

(57) ABSTRACT

A display apparatus includes a display device, a touch panel, and a control device. The control device acts as a display controller. The display controller causes the display device to display an operation screen including a character input field, superimpose a keyboard on the operation screen, when the touch panel receives a touch operation performed on the character input field, and display a first scroll bar for scrolling the operation screen, a displayed portion of which has been reduced by the keyboard superimposed, in a first vacant region in the reduced displayed portion, not overlapping with the character input field and the keyboard.

7 Claims, 15 Drawing Sheets

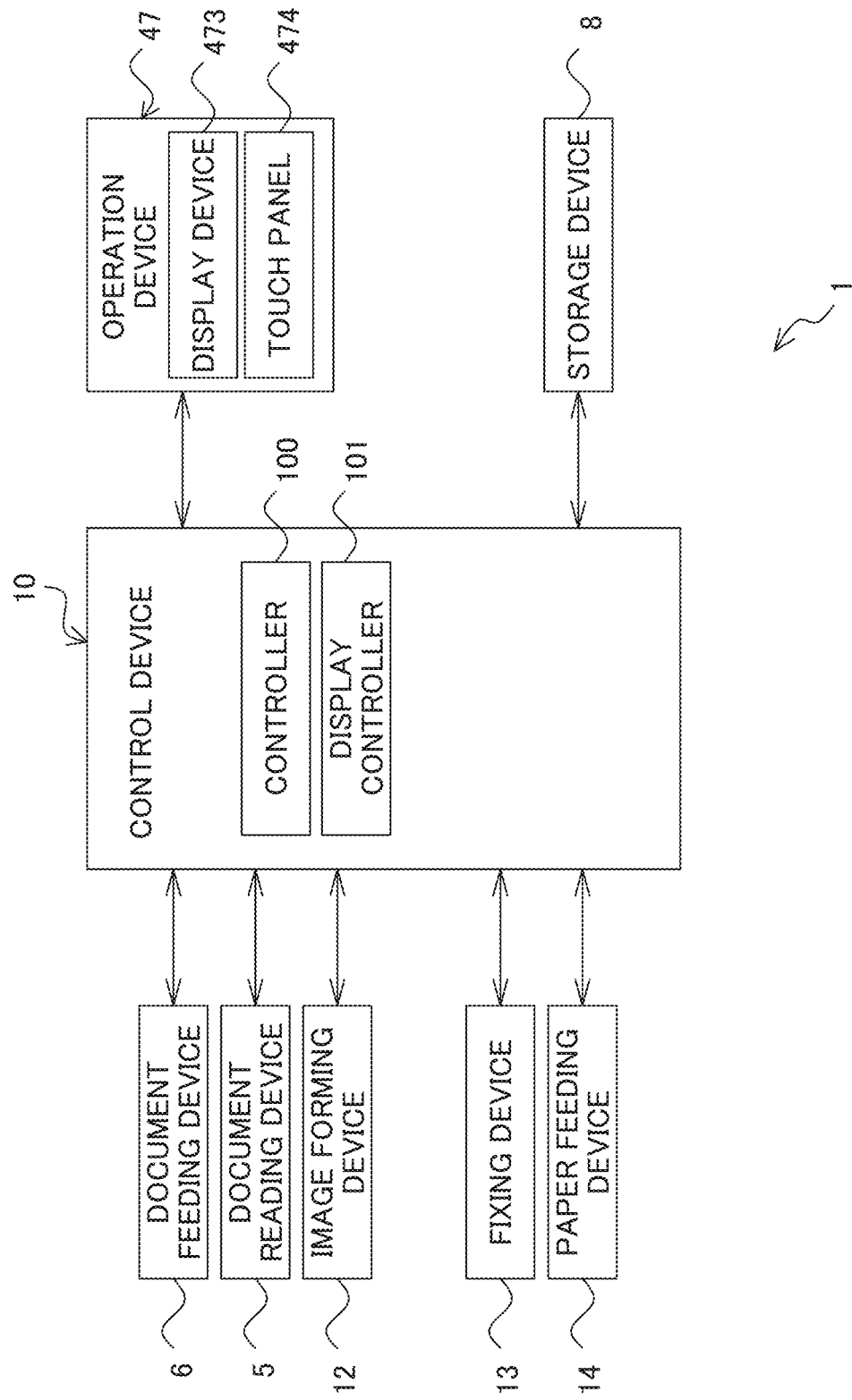

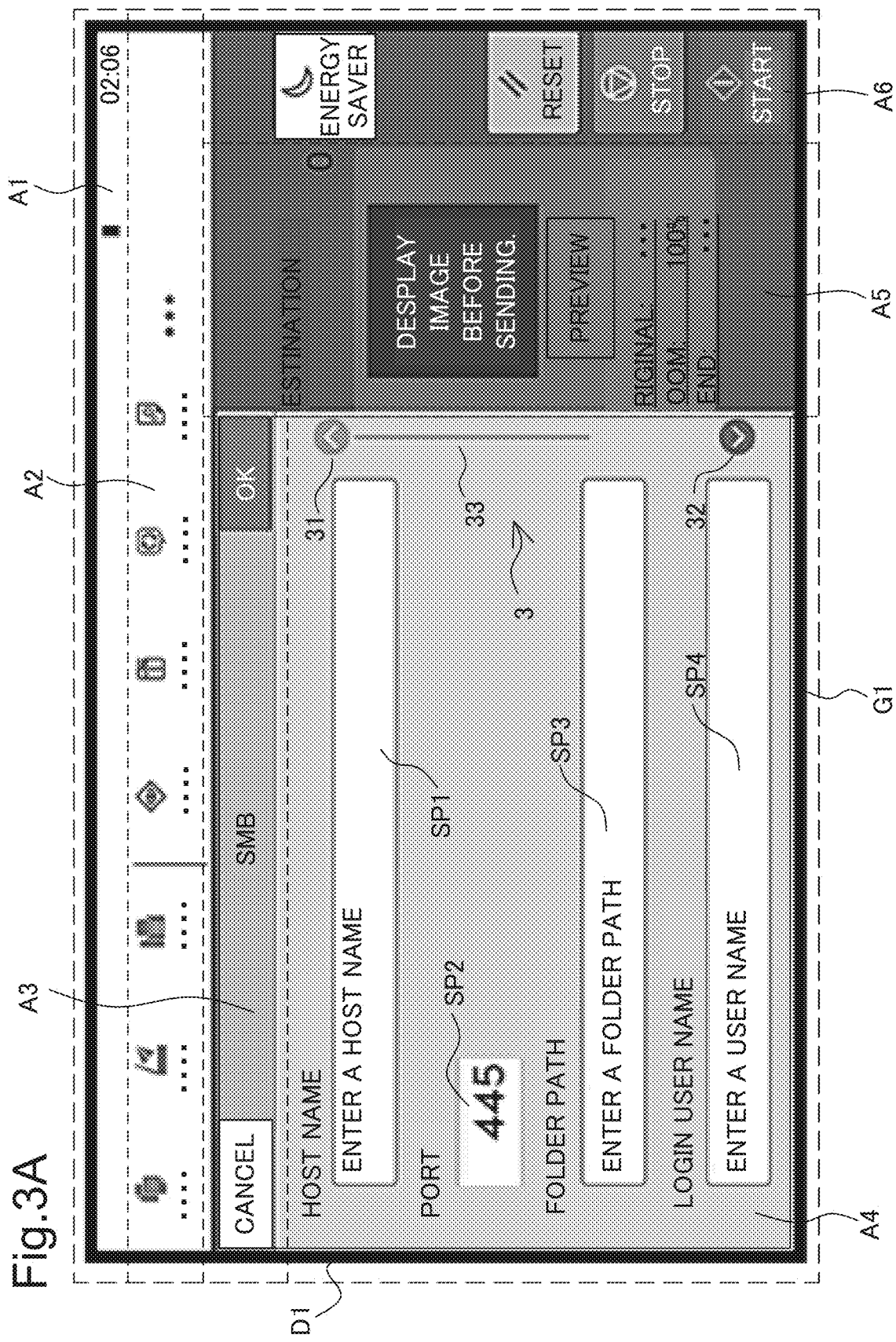

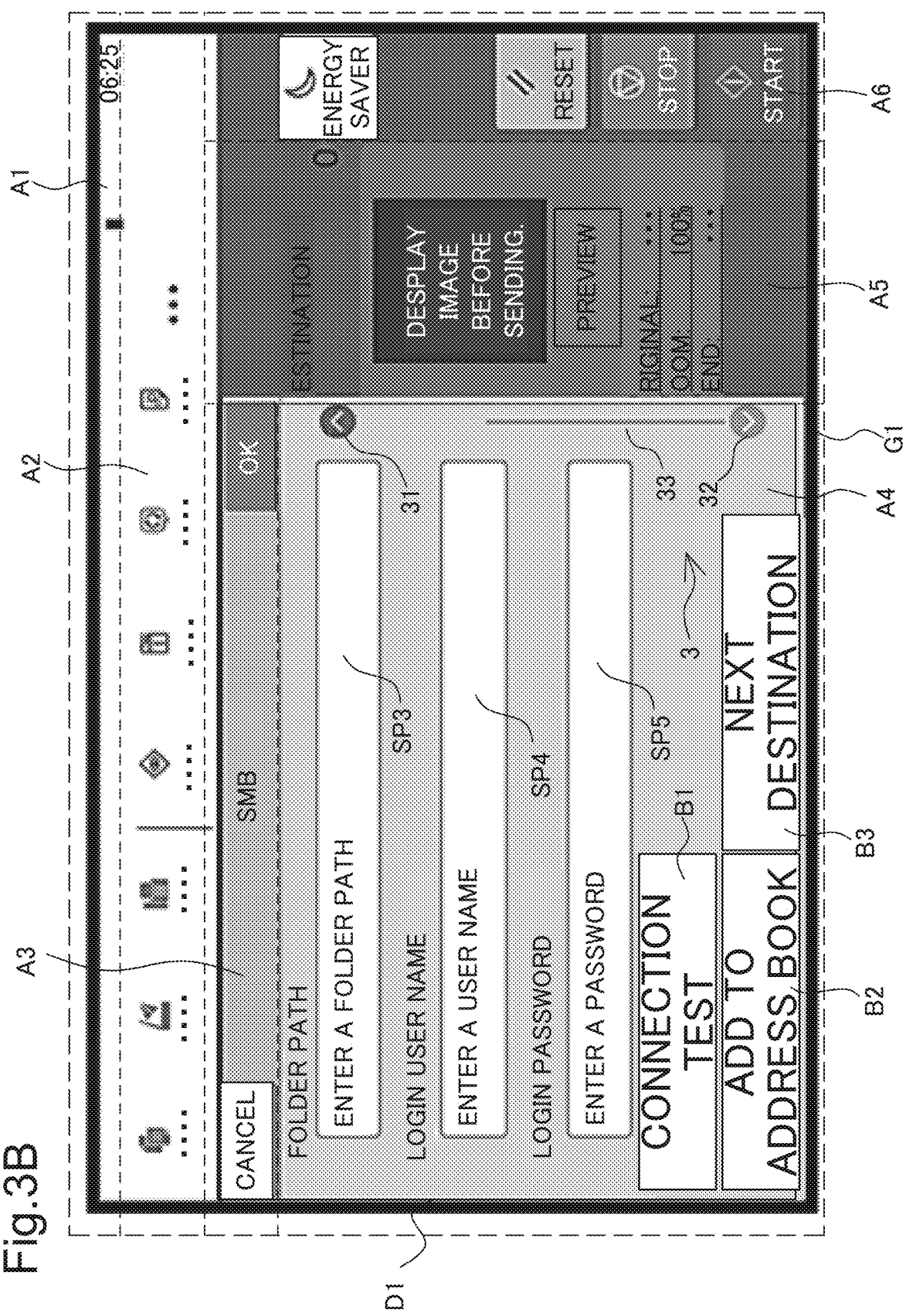

DISPLAY APPARATUS THAT DISPLAYS SCROLL BAR IN DISPLAYED PORTION OF OPERATION SCREEN REDUCED BY SUPERIMPOSED KEYBOARD, AND IMAGE FORMING APPARATUS

INCORPORATION BY REFERENCE

This application claims priority to Japanese Patent Application No. 2021-032653 filed on Mar. 2, 2021, the entire contents of which are incorporated by reference herein.

BACKGROUND

The present disclosure relates to a display apparatus including a touch panel, and to an image forming apparatus.

These days, an increasing number of functions are given to electronic apparatuses that include a touch panel, and the layout of an operation screen is becoming more complicated. Because of the increase in number of items to be handled on the screen, the content of the operation screen is often unable to be fully displayed within a predetermined region of the display screen, and therefore a scrollable display has come to be utilized.

SUMMARY

The disclosure proposes further improvement of the foregoing technique.

In an aspect, the disclosure provides a display apparatus including a display device, a touch panel, and a control device. The touch panel is overlaid on the display device. The control device includes a processor, and acts as a display controller that controls a displaying operation of the display device, when the processor operates according to a control program. The display controller causes the display device to display an operation screen including a character input field, superimpose a keyboard on the operation screen, when the touch panel receives a touch operation performed on the character input field, and display a first scroll bar for scrolling the operation screen, a displayed portion of which has been reduced by the keyboard superimposed, in a first vacant region in the reduced displayed portion, not overlapping with the character input field and the keyboard.

In another aspect, the disclosure provides an image forming apparatus including the foregoing display apparatus, and an image forming device. The image forming device forms an image on a recording medium.

BRIEF DESCRIPTION OF THE DRAWINGS

FIG. 2 is a functional block diagram showing an essential internal configuration of the image forming apparatus;

FIG. 3A and FIG. 3B are schematic drawings each showing an example of a screen;

DETAILED DESCRIPTION

Figure 1:
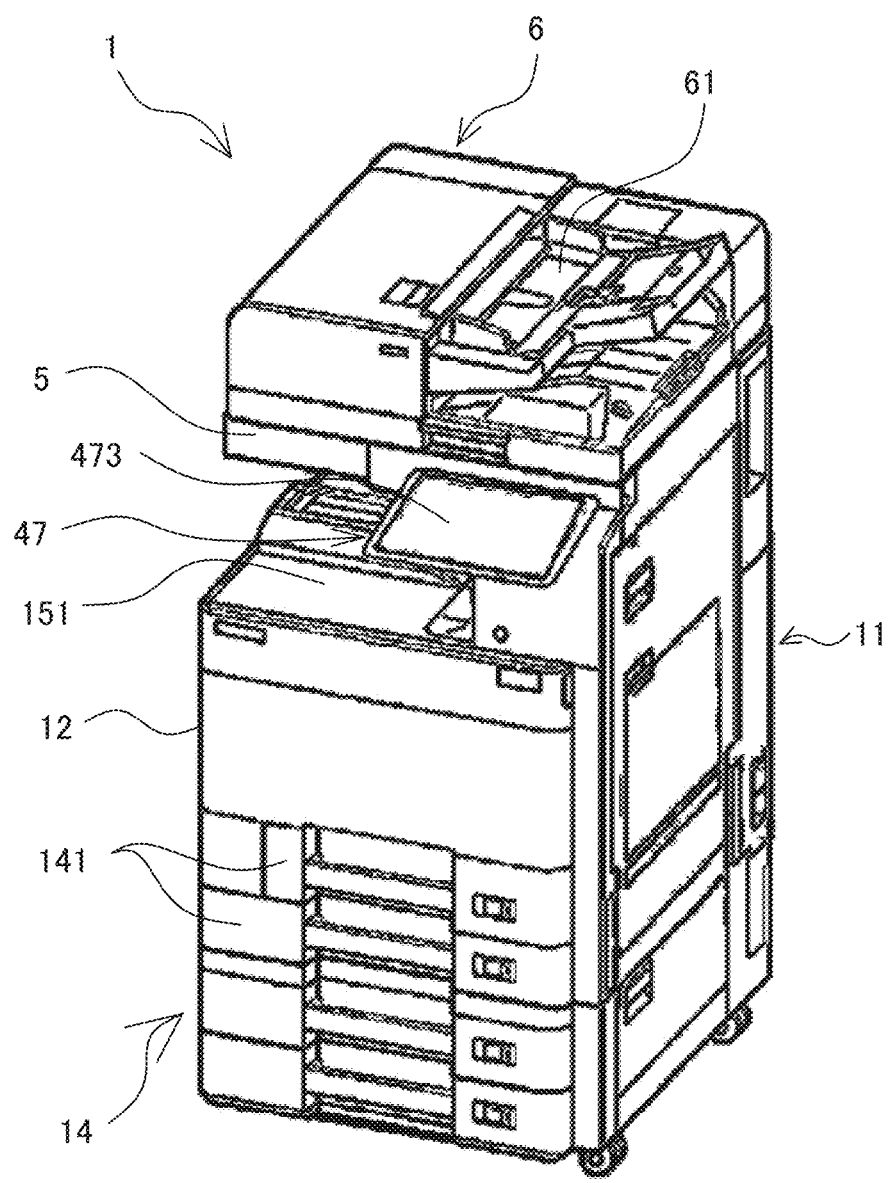
FIG. 1 is a perspective view showing the appearance of an image forming apparatus.

Hereafter, a display apparatus and an image forming apparatus according to some embodiments of the disclosure will be described, with reference to the drawings. FIG. 1 is a perspective view showing the appearance of the image forming apparatus including the display apparatus according to a first embodiment of the disclosure. FIG. 2 is a functional block diagram showing an essential internal configuration of the image forming apparatus.

The image forming apparatus 1 is a multifunction peripheral having a plurality of functions, such as copying, printing, scanning, and facsimile transmission. The image forming apparatus 1 includes, inside a main body 11, a control device 10, a document feeding device 6, a document reading device 5, an image forming device 12, a fixing device 13, a paper feeding device 14, an operation device 47, and a storage device 8.

The document feeding device 6 is provided on the upper face of the document reading device 5, so as to be opened and closed via a hinge or the like. The document feeding device 6 serves as a document retention cover, when a source document placed on a platen glass is to be read. The document feeding device 6 is configured as an automatic document feeder (ADF). The document feeding device 6 includes a document tray 61. The document feeding device 6 delivers the source documents placed on the document tray 61, to the document reading device 5 one by one.

The document feeding device 6 is configured to mechanically reverse the front face and the back face of the source document, after the document reading device 5 has read the image on the front face, and to again feed the source document to the document reading device 5. Thus, the document reading device 5 can read both sides of the source document.

To perform the document reading operation, the image forming apparatus 1 operates as follows. The document reading device 5 optically reads the image on a source document, delivered thereto from the document feeding device 6 or placed on a platen glass, and generates image data. The image data generated by the document reading device 5 is stored, for example, in an image memory.

To perform the image forming operation, the image forming apparatus 1 operates as follows. The image recording device 12 forms a toner image on a recording sheet, exemplifying the recording medium in the disclosure, delivered from the paper feeding device 14, on the basis of the image data generated through the document reading operation, the image data stored in the image memory, or image data received from a computer connected via a network.

The fixing device 13 heats and presses the recording sheet on which the toner image has been formed by the image forming device 12, to thereby fix the toner image onto the recording sheet. The recording sheet that has undergone the fixing process is delivered to an output tray 151. The paper feeding device 14 includes a plurality of paper cassettes 141.

The operation device 47 receives instructions from the user to execute the functions and operations that the image forming apparatus 1 is configured to perform, for example the image forming operation. The operation device 47 includes a display device 473 for displaying, for example, an operation guide for the user. The operation device 47 also includes a touch panel 474 overlaid on the display device 473. The operation device 47 receives the user's instruction detected by the touch panel 474, according to a touch operation performed on the display device 473. For example, the operation device 47 receives an input of a character, according to a touch operation performed on a keyboard, to be subsequently described, displayed on the display device 473.

The display device 473 includes, for example, a liquid crystal display (LCD). When the user touches a button or a key displayed on the display device 473, the touch panel 474 receives the instruction corresponding to the touched position.

The storage device 8 is a large-capacity memory unit such as a hard disk drive (HDD) or a solid state drive (SSD). The storage device 8 contains various types of control programs.

The control device 10 includes a processor, a random-access memory (RAM), a read-only memory (ROM), and an exclusive hardware circuit. The processor is, for example, a central processing device (CPU), an application specific integrated circuit (ASIC), or a micro processing device (MPU).

The control device 10 acts, when the processor operates according to the control program stored in the storage device 8, as the controller 100 and a display controller 101. Here, the controller 100 and other components cited above may each be constituted in the form of a hardware circuit, instead of being realized by the control device 10 according to the control program. This also applies to other embodiments, unless otherwise specifically noted.

The controller 100 controls the overall operation of the image forming apparatus 1. The controller 100 is connected to the document feeding device 6, the document reading device 5, the image forming device 12, the storage device 8, the fixing device 13, the paper feeding device 14, the operation device 47, and the storage device 8, to control the operation of the mentioned components. For example, the controller 100 controls the operation of the image forming device 12, so as to form the image of the source document, acquired through the reading operation by the document reading device 5, on the recording sheet exemplifying the recording medium in the disclosure.

The display controller 101 controls the displaying operation of the display device 473. For example, the display controller 101 causes the display device 473 to display an operation screen, according to the user's instruction inputted through the operation device 47.

FIG. 3A and FIG. 3B are schematic drawings each showing an example of the screen G1 that the display controller 101 causes the display device 473 to display. The screen G1 shown in FIG. 3A and FIG. 3B includes a plurality of display regions A1 to A6. The display controller 101 causes the display device 473 to display an operation screen D1 in the display region A4, which is a part of the screen G1. The display controller 101 also causes the display device 473 to display a scroll bar 3 for scrolling the operation screen D1, in a second vacant region that does not overlap with character input fields SP1 to SP4 in the displayed portion of the operation screen D1.

Figure 4:
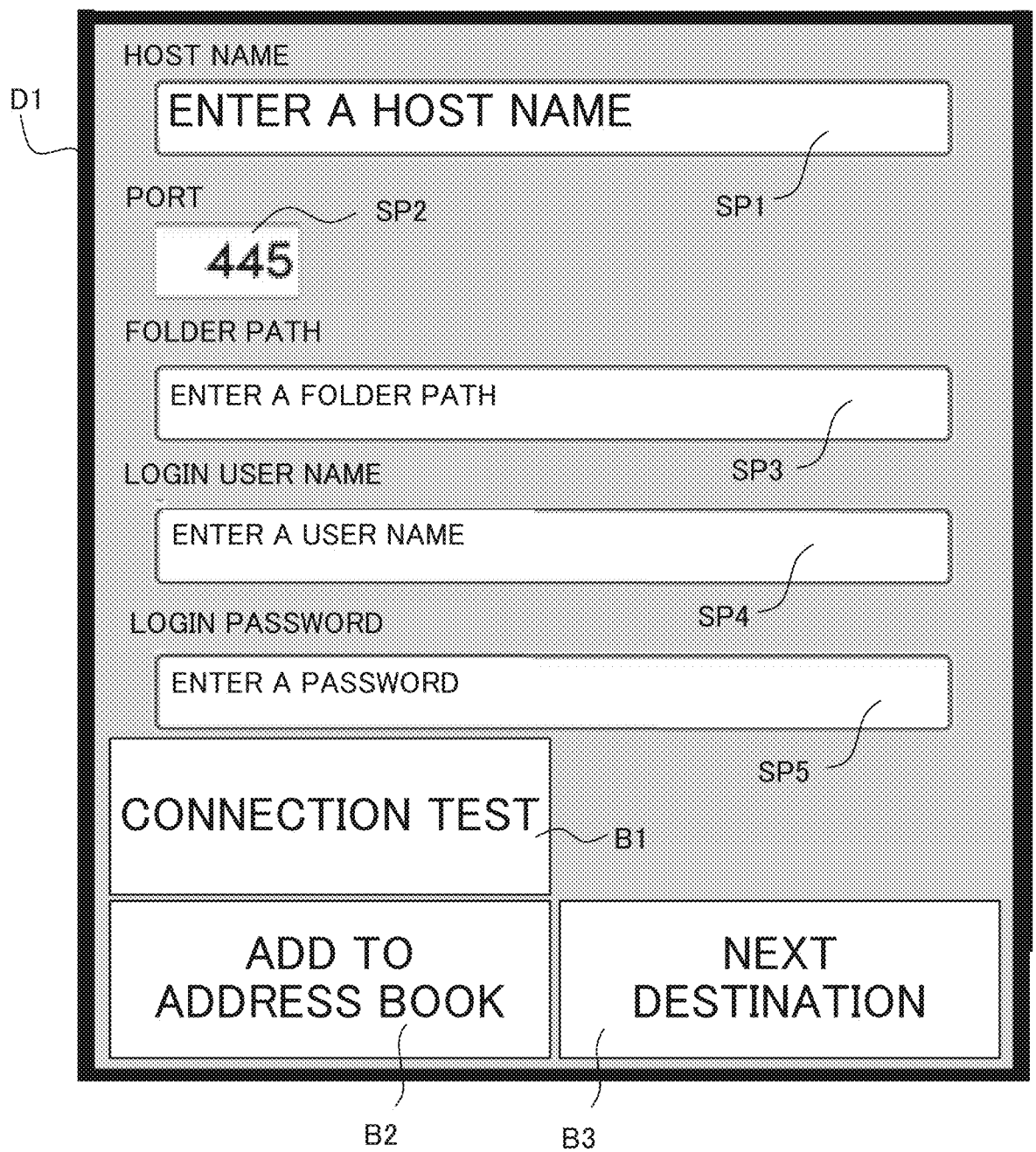
FIG. 4 is a schematic drawing showing the entirety of an operation screen.

FIG. 4 illustrates the entirety of the operation screen D1. As shown in FIG. 4, the operation screen D1 includes the character input fields SP1 to SP5 (e.g., text boxes) for inputting characters, and operation buttons B1 to B3.

Referring to FIG. 3A, the scroll bar 3 includes an upward arrow 31 for scrolling down the operation screen D1 (i.e., for inputting an instruction to scroll in a predetermined first direction), a downward arrow 32 for scrolling up the operation screen D1 (i.e., for inputting an instruction to scroll in a predetermined second direction opposite to the first direction), and a knob 33 indicating the position of the displayed portion in the operation screen D1 displayed in the display region A4, with respect to the entirety of the operation screen D1. In view of the position and the size of the knob 33 shown in FIG. 3A, the displayed portion of the operation screen D1 currently displayed in the display region A4 corresponds to approximately two thirds from the head of the operation screen D1, in the illustrated example. Here, the upward arrow 31 and the downward arrow 32 respectively exemplify the first button and the second button in the disclosure.

Figure 5:
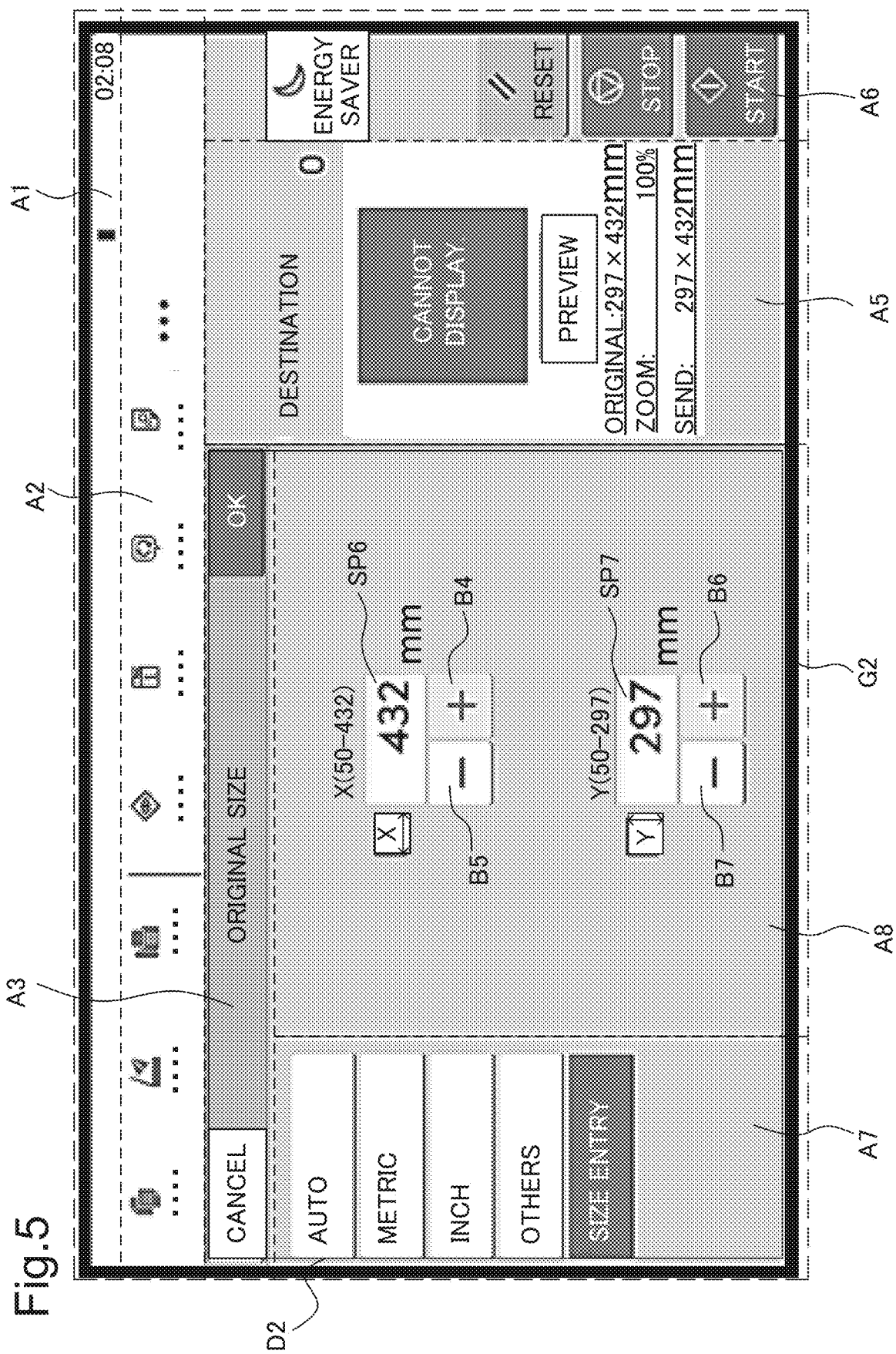
FIG. 5 is a schematic drawing showing another example of the screen.

FIG. 5 illustrates another example of the screen that the display controller 101 causes the display device 473 to display. The screen G2 shown in FIG. 5 includes a plurality of display regions A1 to A3, and A5 to A8. The display controller 101 causes the display device 473 to display an operation screen D2, in the display region A8. The operation screen D2 includes character input fields SP6 and SP7 for inputting only numerals, and operation buttons B4 to B7 each representing a plus sign or a minus sign for increasing or decreasing the numeral inputted in the character input fields SP6 and SP7.

When the operation device 47 receives a predetermined operation performed on the character input field, the display controller 101 retrieves the image of a keyboard (hereinafter, simply "keyboard") from the storage device 8, and causes the display device 473 to superimpose the retrieved keyboard on the operation screen D1 in the screen G1, or on the operation screen D2 in the screen G2.

The display controller 101 sets the operation screen D1 or D2, the displayed portion of which has been reduced by the keyboard that has been superimposed, to the scrollable display. To be more detailed, the display controller 101 causes the display device 473 to display the scroll bar for scrolling the operation screen D1 or D2 with the reduced displayed portion, and indicating the position of the displayed portion of the operation screen D1 or D2, with respect to the entirety thereof, in a first vacant region that does not overlap with the character input field and the keyboard, in the reduced displayed portion of the operation screen D1 or D2.

For example, when the touch panel 474 detects a touch operation performed on the character input field SP1 shown in FIG. 3A, the display controller 101 retrieves the keyboard KB1 (e.g., QWERTY keyboard) from the storage device 8, and causes the display device 473 to superimpose the keyboard KB1 retrieved, on the screen G1.

Figure 7A:
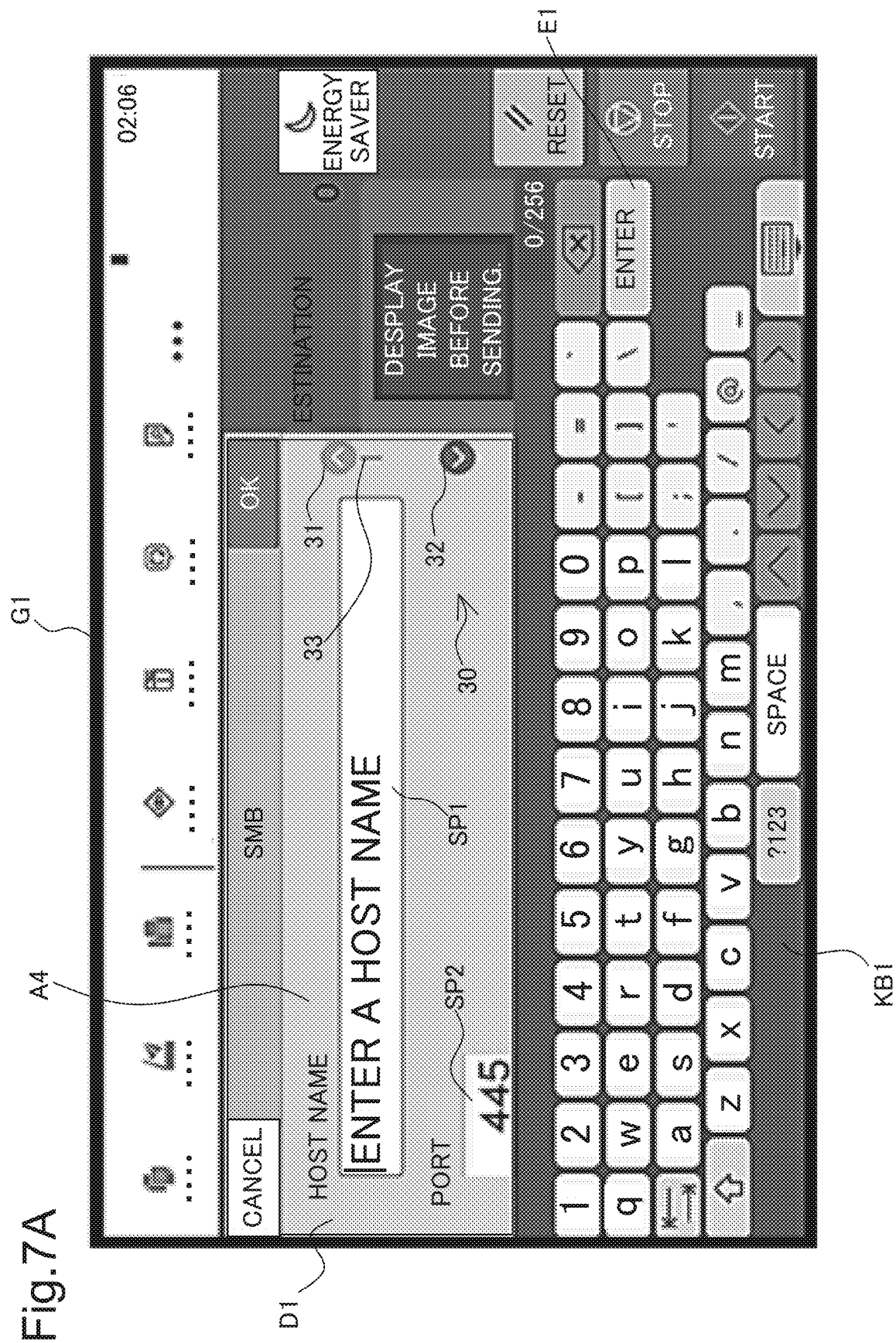
FIG. 7A and FIG. 7B are schematic drawings each showing an example of the operation screen on which the keyboard is superimposed.

The display controller 101 further causes the display device 473 to display, as shown in FIG. 7A, a scroll bar 30 in the first vacant region that does not overlap with the character input fields SP1 and SP2, and the keyboard KB1, in the displayed portion of the operation screen D1 reduced by the keyboard KB1 superimposed. The scroll bar 30 includes, like the scroll bar 3, the upward arrow 31, the downward arrow 32, and the knob 33.

In the case where the scroll bar 3 was displayed in the second vacant region in the operation screen D1, before superimposing the keyboard KB1 on the operation screen D1, the display controller 101 generates the scroll bar 30 by reducing the length of the scroll bar 3 so as to fit in the reduced displayed portion, and causes the display device 473 to display the generated scroll bar 30, in the first vacant region.

Figure 7B:
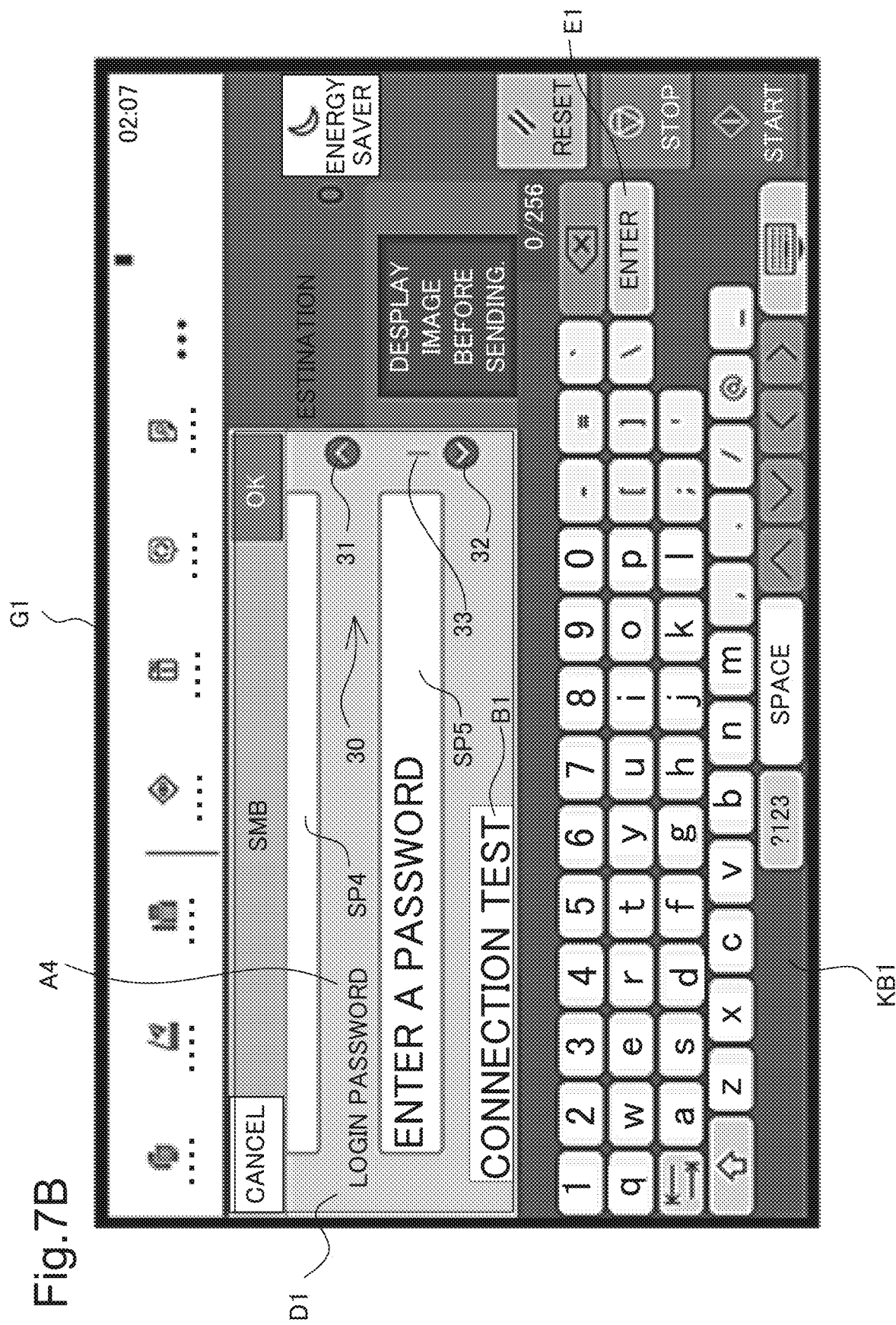

FIG. 7B illustrates the screen in which the display controller 101 has caused the display device 473 to scroll up the operation screen D1, in response to the touch on the downward arrow 32 on the screen shown in FIG. 7A, and detected by the touch panel 474.

For example, when the touch panel 474 detects a touch operation performed on the character input field SP6 shown in FIG. 5, the display controller 101 retrieves a keyboard KB2 (tenkey board) from the storage device 8, and causes the display device 473 to superimpose the keyboard KB2 retrieved, on the screen G2. It is because the character input field SP6 is set to accept only numerals, that the display controller 101 retrieves the tenkey board, instead of the QWERTY keyboard.

Figure 9A:
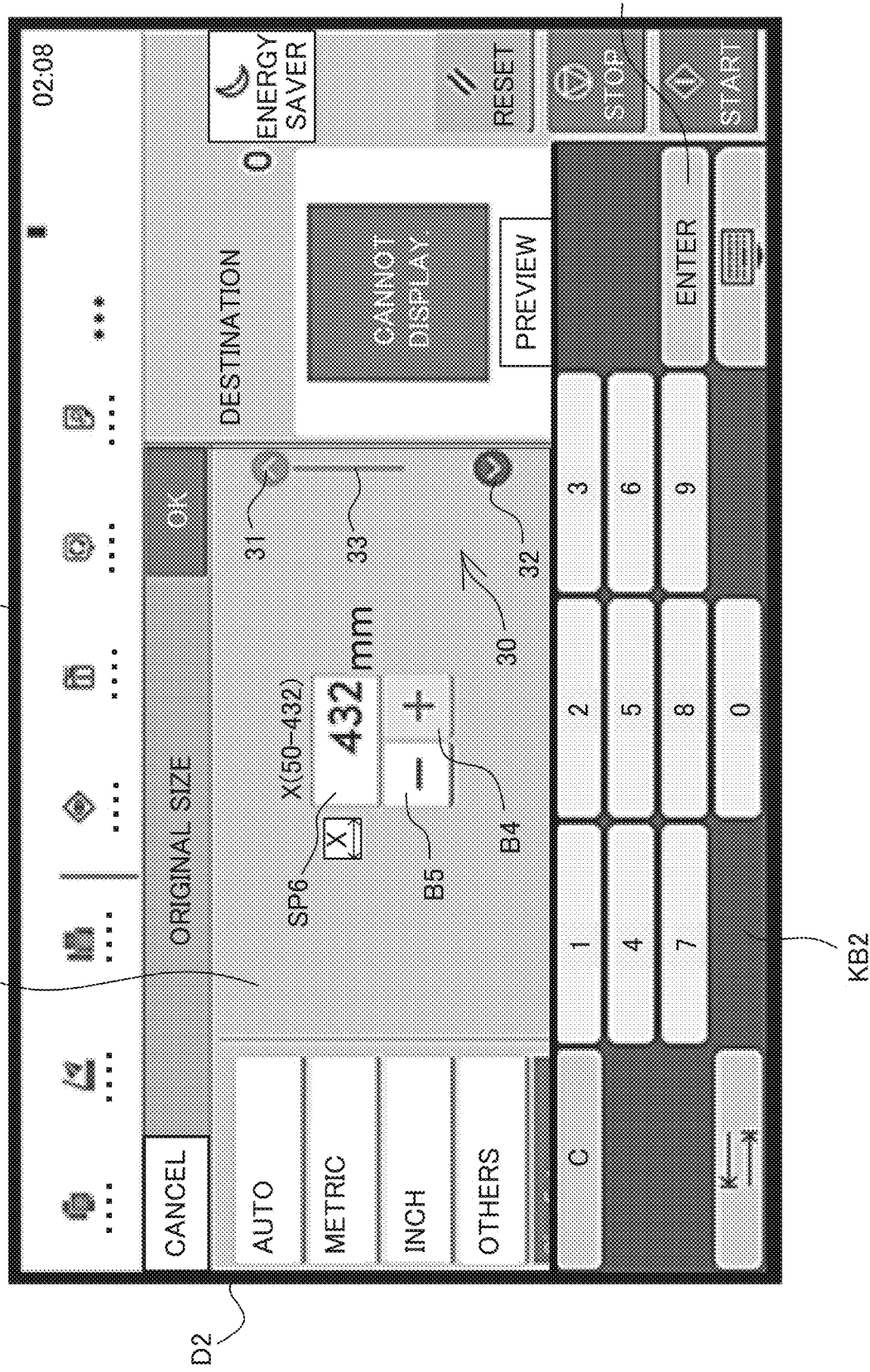
FIG. 9A and FIG. 9B are schematic drawings each showing an example of the operation screen on which the keyboard is superimposed.

The display controller 101 further causes the display device 473 to display, as shown in FIG. 9A, the scroll bar 30 in the first vacant region that does not overlap with the character input field SP6 and the keyboard KB2, in the displayed portion of the operation screen D2 reduced by the keyboard KB2 superimposed.

Figure 9B:
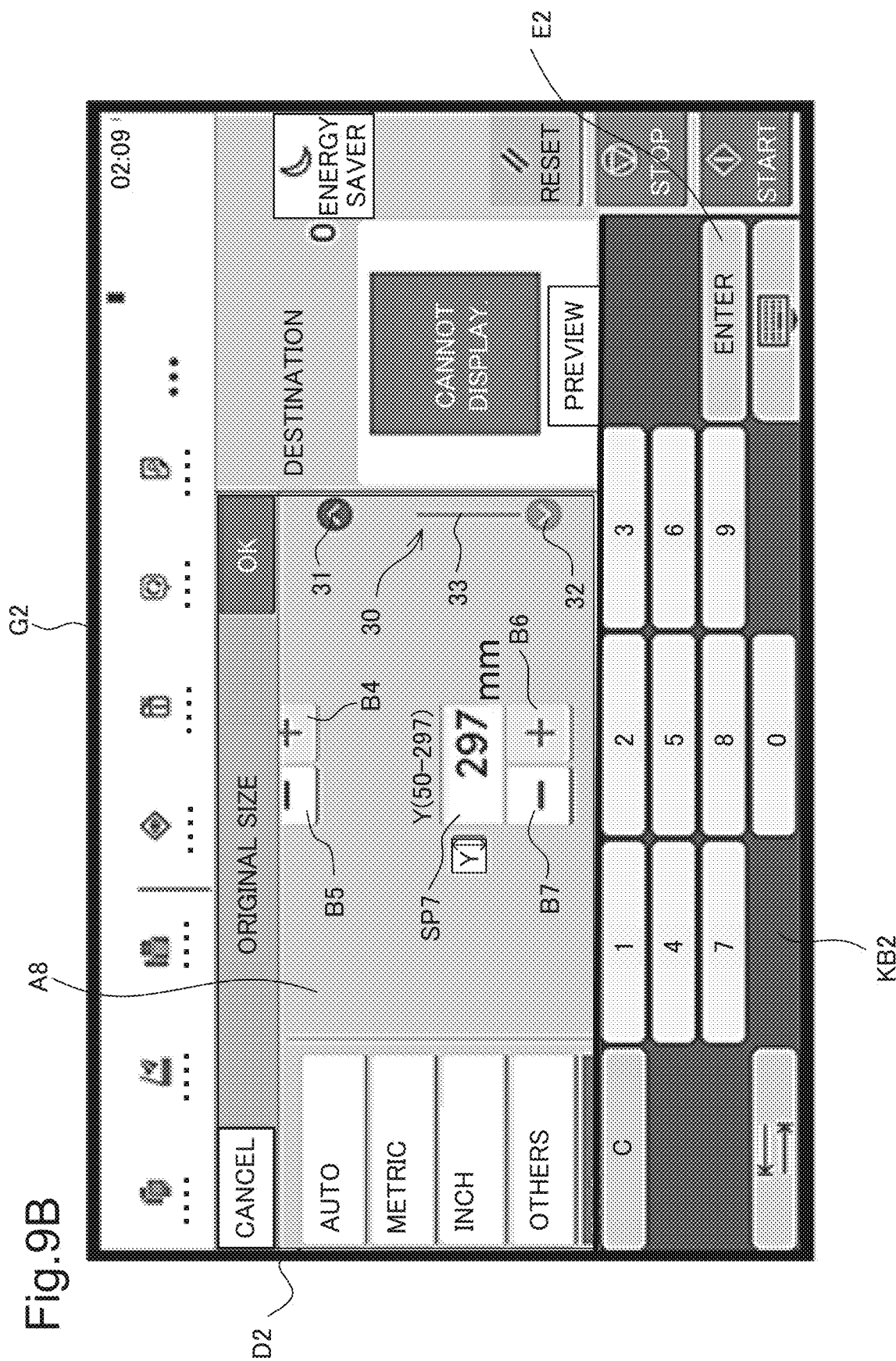

FIG. 9B illustrates the screen in which the display controller 101 has caused the display device 473 to scroll up the operation screen D2, in response to the touch on the downward arrow 32 on the screen shown in FIG. 9A, and detected by the touch panel 474.

Figure 10:
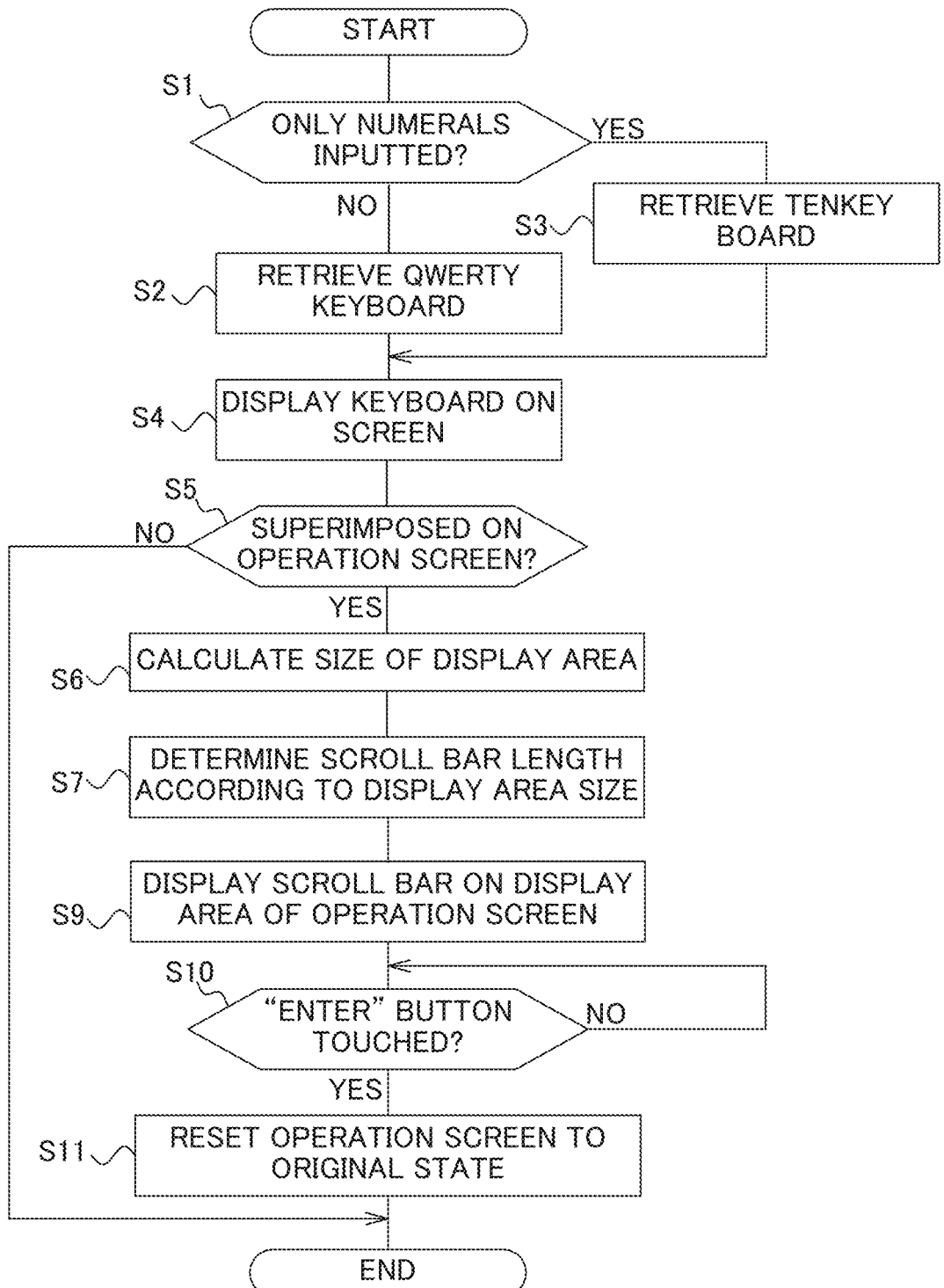
FIG. 10 is a flowchart showing a scroll bar displaying operation according to a first embodiment.

Hereunder, a scroll bar displaying operation according to a first embodiment of the disclosure will be described, with reference to the flowchart shown in FIG. 10. For example, when the touch panel 474 detects a touch operation on the character input field, and accordingly the operation device 47 receives the user's instruction to input characters in the character input field, the display controller 101 starts the scroll bar displaying operation.

When the operation device 47 receives the user's instruction to input characters in the character input field, the display controller 101 decides whether the character input field can only accept numerals (step S1).

Upon deciding that the character input field can accept not only numerals (NO at step S1), the display controller 101 retrieves the keyboard KB1 (QWERTY keyboard) from the storage device 8 (step S2). In contrast, upon deciding that the character input field can only accept numerals (YES at step S1), the display controller 101 retrieves the keyboard KB2 (tenkey board) from the storage device 8 (step S3).

The display controller 101 causes the display device 473 to superimpose the keyboard KB1 or KB2, whichever has been retrieved, on the screen (step S4). For example, the display controller 101 causes the display device 473 to superimpose the keyboard KB1 on the screen G1, as shown in FIG. 7A. As another example, the display controller 101 causes the display device 473 to superimpose the keyboard KB2 on the screen G2, as shown in FIG. 9A. In such cases, the display controller 101 introduces the keyboard KB1 or KB2, gradually upward from the lower end of the screen G1 or G2.

After step S4, the display controller 101 decides whether the keyboard KB1 or KB2 has been superimposed on the operation screen D1 or D2 (step S5). Here, the display controller 101 decides whether the keyboard KB1 or KB2 has been superimposed on the operation screen D1 or D2, on the basis of a coordinate indicating the display region of the operation screen D1 in the screen G1, or the display region of the operation screen D2 in the screen G2, and a coordinate indicating the display region of the keyboard KB1 or KB2.

Upon deciding that the keyboard KB1 or KB2 is superimposed on the operation screen D1 or D2 (YES at step S5), the display controller 101 calculates the length of the display region A4 or A8 in the scroll direction in the state where the keyboard KB1 or KB2 is displayed, by subtracting the length of the keyboard KB1 or KB2 in the scroll direction from the length of the display region A4 or A8 in the scroll direction in the state where the keyboard KB1 or KB2, and sets the length thus calculated as the size of the displayed portion of the operation screen D1 or D2 in the scroll direction, in the state where the keyboard KB1 or KB2 is displayed (step S6). The display controller 101 then determines the length of the scroll bar 30, according to the size of the displayed portion calculated as above (step S7).

After step S7, the display controller 101 causes the display device 473 to display the scroll bar 30 having the length determined as above in the first vacant region that does not overlap with the character input field and the keyboard KB1 or KB2, in the displayed portion of the operation screen D1 or D2 having the reduced size (step S9).

Thus, when the keyboard KB1 is to be superimposed on the operation screen D1, in the state where the scroll bar 3 is displayed in the operation screen D1, the display controller 101 generates the scroll bar 30 by reducing the length of the scroll bar 3 so as to fit in the reduced displayed portion, and causes the display device 473 to display the scroll bar 30 in the first vacant region in the operation screen D1.

In contrast, when the keyboard KB2 is to be superimposed on the operation screen D2, in the state where the scroll bar 3 is not displayed in the operation screen D2, the display controller 101 generates the scroll bar 30 having the length that fits in the reduced displayed portion, and causes the display device 473 to display the scroll bar 30 in the first vacant region in the operation screen D2.

Here, the keyboard KB2 is shorter than the keyboard KB1, in the scroll direction. Accordingly, when the keyboard KB2 is superimposed, the display controller 101 makes the scroll bar 30 in the displayed region longer in the scroll direction, than the length in the state where the keyboard KB1 is superimposed.

Then the display controller 101 decides whether the operation device 47 has received the user's operation performed on an operation button E1 or E2 (see FIG. 7A or FIG. 9A) marked as "Enter" in the keyboard KB1 or KB2 (step S10). The operation button E1 or E2 is for receiving the user's instruction to fix the characters inputted.

Upon deciding that the touch panel 474 has detected a touch operation performed on the operation button E1 or E2 (YES at step S10), the display controller 101 erases the scroll bar 30 and the keyboard KB1 or KB2 from the operation screen D1 or D2, and restores the screen G1 or G2 of the original state where the keyboard KB1 or KB2 is not displayed (step S11). After step S11, the display controller 101 finishes the scroll bar displaying operation.

Upon deciding that the keyboard KB1 or KB2 is not superimposed on the operation screen D1 or D2 (NO at step S5), the display controller 101 maintains the current display on the operation screen D1 or D2 as it is, without displaying the scroll bar 30, and finishes the scroll bar displaying operation.

Figure 6:
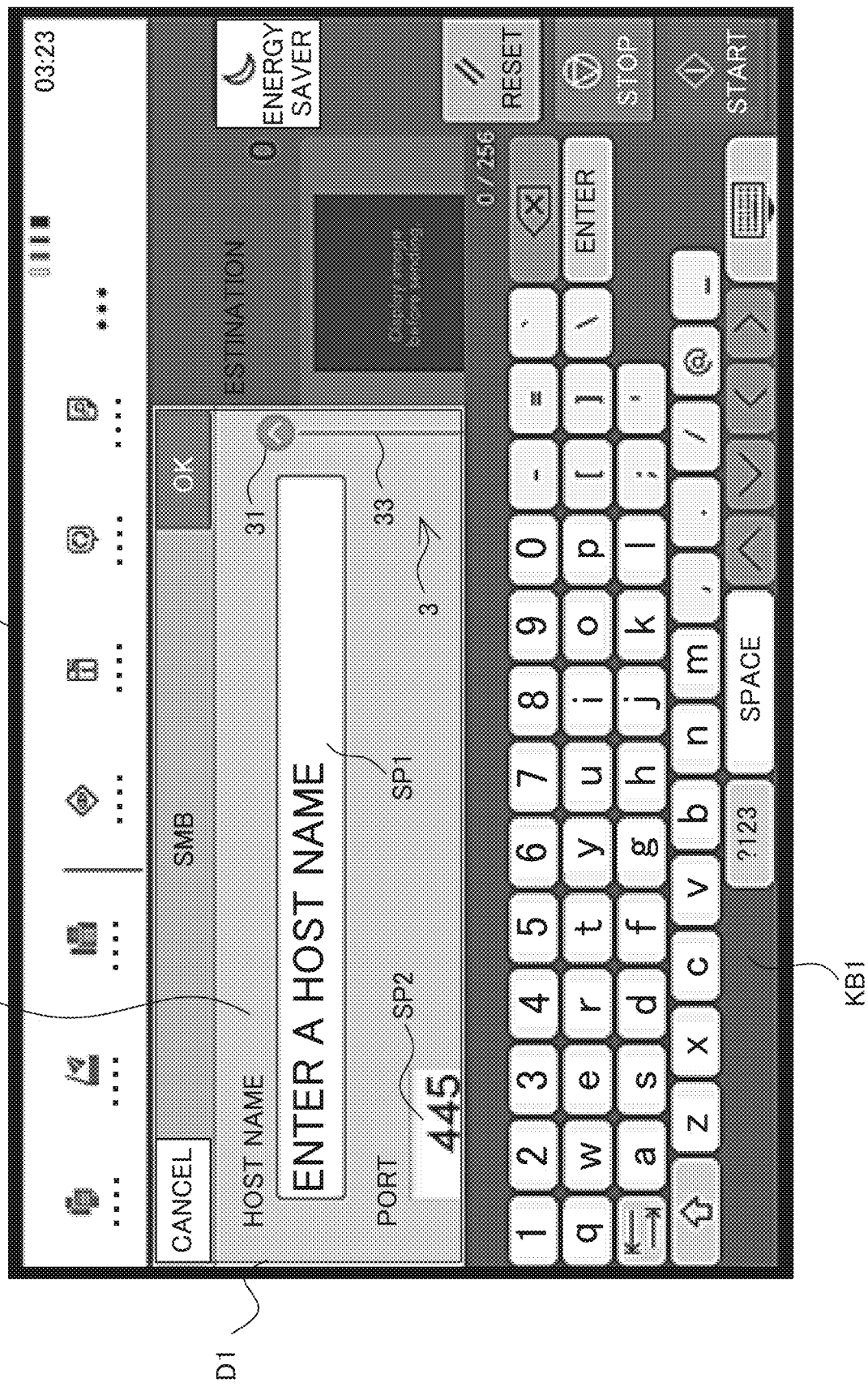
FIG. 6 is a schematic drawing showing a reference example of the operation screen on which a keyboard is superimposed.
Figure 8:
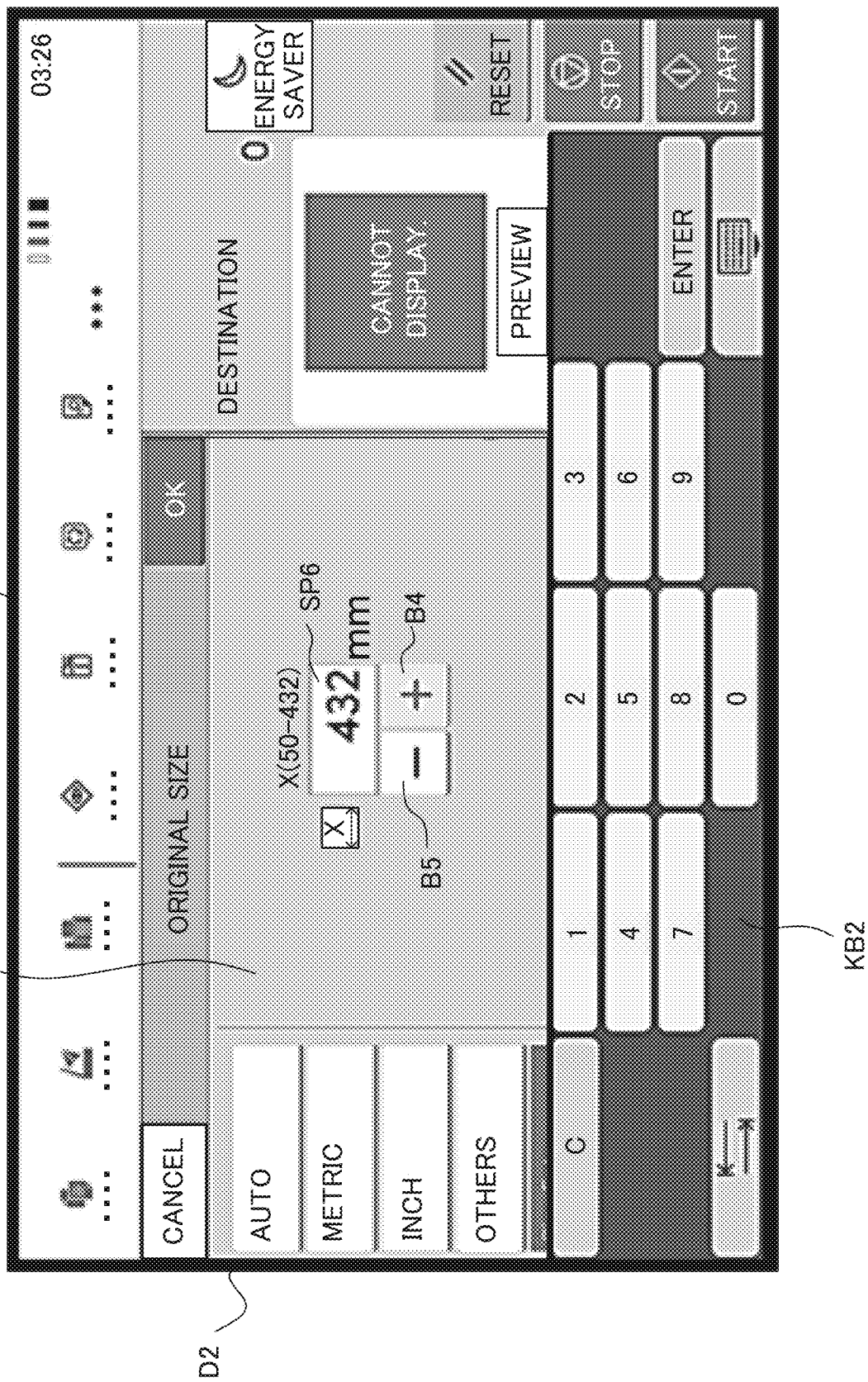
FIG. 8 is a schematic drawing showing another reference example of the operation screen on which the keyboard is superimposed.

Now, an image forming apparatus is known that is configured to superimpose the keyboard KB1 or KB2 on the screen G1 or G2 as shown in FIG. 6 or FIG. 8, for example when the user touches the character input field SP1 or SP6, on the operation screen D1 shown in FIG. 3A or operation screen D2 shown in FIG. 5A, to accept the input of characters in the character input field SP1 or SP6. The user can input characters in the character input field SP1 or SP6, using the keyboard KB1 or KB2 and the touch panel.

However, when the keyboard KB1 or KB2 is superimposed on the screen G1 or G2, the character input field SP3, SP4 or SP7 is hidden by the keyboard KB1 or KB2 as shown in FIG. 6 or FIG. 8, and therefore the user is unable to input characters in the character input field SP3, SP4 or SP7.

In addition, the downward arrow 32 of the scroll bar 3 is also hidden, and the user is unable to input a scroll-up instruction. Thus, the existing image forming apparatus has a drawback in that the operability and user-friendliness are significantly impaired, when the keyboard KB1 or KB2 is superimposed on the screen G1 or G2.

According to the first embodiment, unlike the above, the scroll bar 30 is displayed in the displayed portion of the operation screen D1 or D2, having the reduced size, when the keyboard KB1 or KB2 is to be superimposed on the operation screen D1 or D2. Therefore, the portion hidden by the keyboard KB1 or KB2 can be displayed, without erasing the display of the keyboard KB1 or KB2. In addition, the user can recognize the position of the displayed portion of the operation screen D1 or D2 with respect to the entirety thereof, in view of the appearance of the scroll bar 30.

Further, since the scroll bar 30 is displayed in the vacant region that does not overlap with the keyboard KB1 or KB2, the operation of the keyboard KB1 or KB2 is in no way disturbed by the scroll bar 30. Therefore, the degradation in operability and user-friendliness, arising from the superimposition of the keyboard KB1 or KB2 on the operation screen, can be prevented.

According to the first embodiment, the display controller 101 calculates and determines the length of the scroll bar 30, each time the display controller 101 performs the scroll bar displaying operation. However, the types of the operation screen in which the character input fields are displayed, and the types of the keyboard are limited. Accordingly, the display controller 101 may prepare in advance, instead of calculating the length of the scroll bar 30 each time, the lengths of the scroll bar 30 for each of the combinations of the operation screen and the keyboard to be displayed, on the basis of the respective sizes of the operation screens and the keyboards.

Here, the keyboard to be superimposed on the operation screen is not limited to the QWERTY keyboard or tenkey board. Other examples of the keyboard include a Japanese syllabary keyboard on which the Japanese hiraganas are arranged by the syllabary order.

As described above, the user can recognize the proportion in size of the displayed portion of the operation screen with respect thereto, from the size of the knob 33 of the scroll bar 30. In the case of FIG. 7A or FIG. 7B for example, the user can recognize that the size of the displayed portion of the operation screen D1 displayed in the display region A4 is approximately 30% of the entirety of the operation screen D1, from the size of the knob 33.

On the other hand, there may be a case where it is difficult for the user to recognize the proportion in size of the displayed portion of the operation screen, with respect thereto, from the size of the knob 33. Accordingly, as another embodiment of the disclosure, the display controller 101 may set the length of the scroll bar 30 to be displayed in the reduced displayed portion of the operation screen, to a length proportional to the overall length of the operation screen. In other words, the display controller 101 may set the length of the scroll bar 30 to the larger value, the longer the overall length of the operation screen is. In this case, the user can recognize, from the length of the scroll bar 30, the size of the remaining portion of the operation screen that appears by scrolling the display, and also the size of the entirety of the operation screen.

Hereunder, a scroll bar displaying operation according to a second embodiment of the disclosure will be described. In the scroll bar displaying operation according to the second embodiment, the display controller 101 restricts the display device 473 from displaying the scroll bar 30, in the case where the keyboard can be displayed, with the character input field in the operation screen kept displayed, without being erased, when the keyboard is to be superimposed on the operation screen.

In other words, the display controller 101 decides whether the character input field is hidden, by superimposing the keyboard on the operation screen. Upon deciding that the character input field is hidden, the display controller 101 allows the display device 473 to display the scroll bar 30, but restricts the display device 473 from displaying the scroll bar 30, upon deciding that the character input field is not hidden. For example, the display controller 101 decides whether the keyboard is superposed on the position of the character input field, on the basis of the coordinate indicating the display region of the character input field in the operation screen, and the coordinate indicating the display region of the keyboard.

Figure 11A:
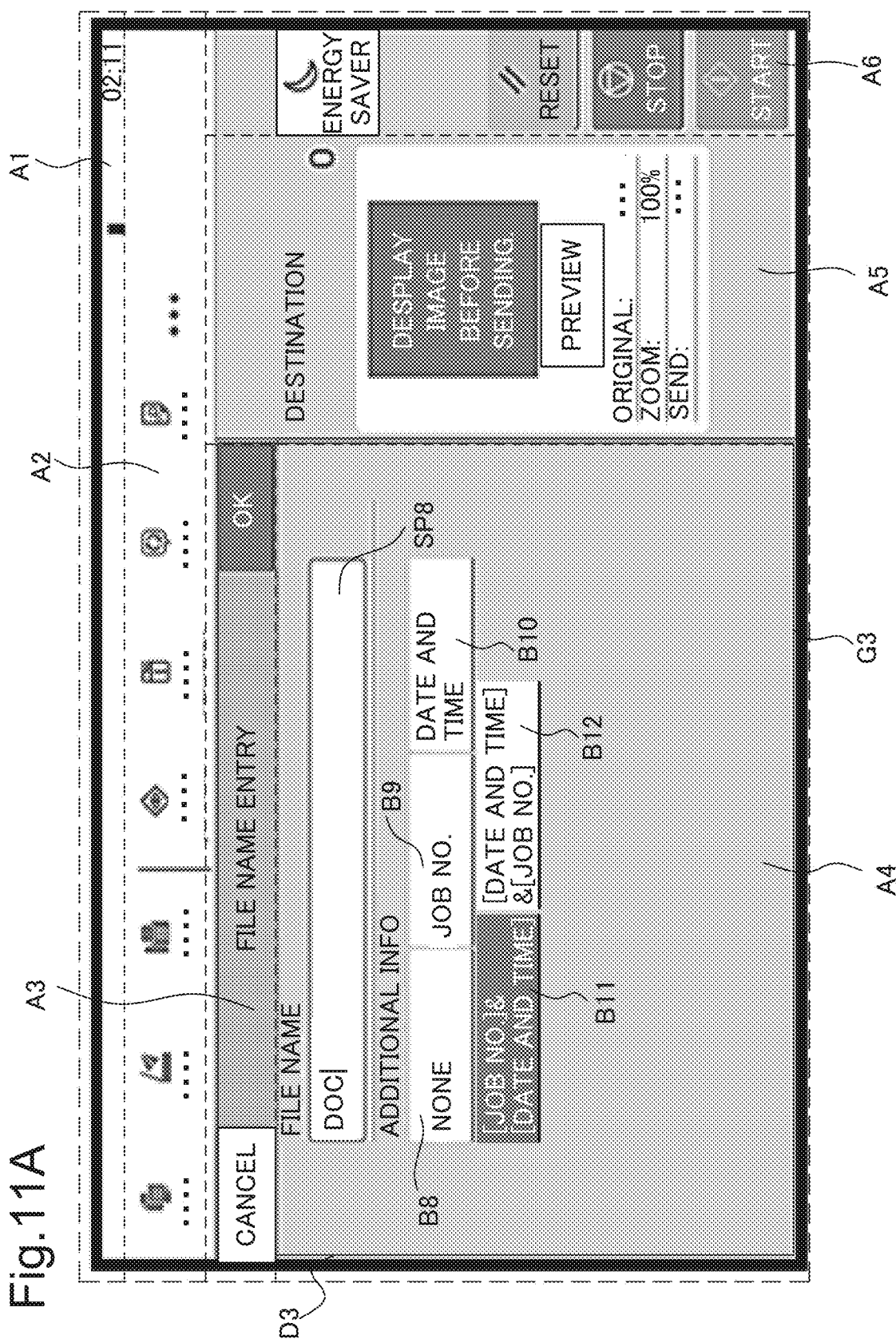
FIG. 11A is a schematic drawing showing an example of the operation screen on which the keyboard is not superimposed.

FIG. 11A illustrates an example of the operation screen on which the keyboard is not superimposed. A screen G3 shown in FIG. 11A includes the plurality of display regions A1 to A6. The display controller 101 has caused the display device 473 to display an operation screen D3 in the display region A4. The operation screen D3 includes a character input field SP8, and operation buttons B8 to B12.

When the touch panel 474 detects a touch operation performed on the character input field SP8, the display controller 101 retrieves the keyboard KB1 from the storage device 8, and causes the display device 473 to superimpose the keyboard KB1 retrieved, on the operation screen D3.

Figure 11B:
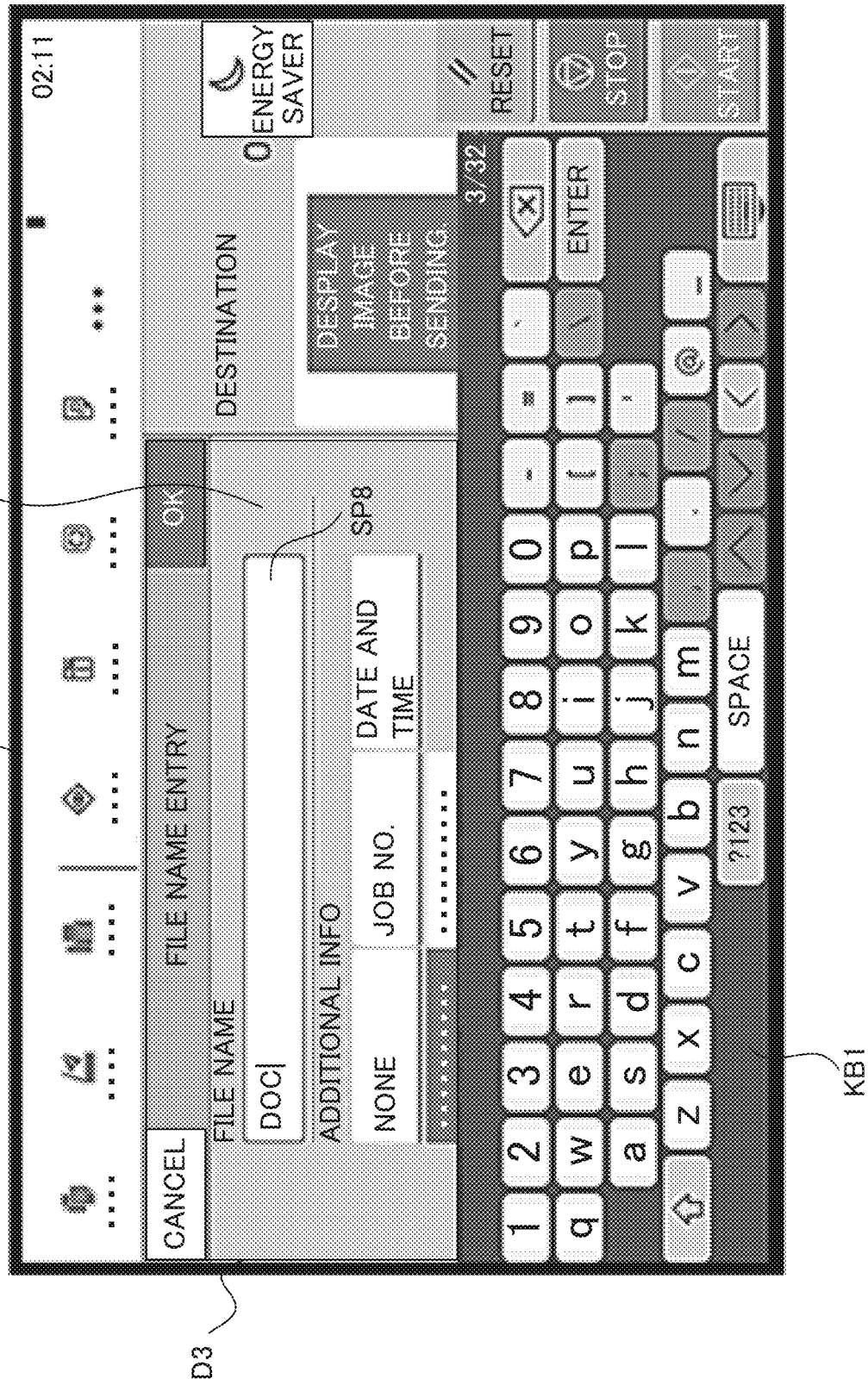
FIG. 11B is a schematic drawing showing an example of the operation screen on which the keyboard is superimposed.

Referring to FIG. 11B, although the keyboard KB1 is superimposed on the operation screen D3, and the displayed portion of the operation screen D3 in the display region A4 is reduced, it is only the operation buttons B11 and B12 that are hidden, and the character input field is exempted from being hidden. In this case, the display controller 101 restricts the display device 473 from displaying the scroll bar 30, as shown in FIG. 11B.

According to the second embodiment, the scroll bar 30 is not displayed, when the operation is not affected by the absence of the scroll bar 30. As a result, the operability and user-friendliness in the state where the keyboard is superimposed on the operation screen can be further improved.

However, there may be a case where the displayed portion of the operation screen becomes significantly small, by the superimposition of the keyboard on the operation screen, making it difficult to visibly display the scroll bar 30. For example, when the displayed portion of the operation screen is significantly small, the upward arrow 31 and the downward arrow 32 of the scroll bar 30 may have to be positioned so as to substantially overlap each other.

Accordingly, as another embodiment of the disclosure, the display controller 101 decides whether the length of the displayed portion of the operation screen in the scroll direction is equal to or longer than a predetermined length necessary for displaying the upward arrow 31 and the downward arrow 32. Upon deciding that the length of the displayed portion in the scroll direction is shorter than the predetermined length, the display controller 101 causes the display device 473 to display the scroll bar 30 including only one of the upward arrow 31 and the downward arrow 32, or including neither thereof, in the first vacant region.

Alternatively, upon deciding that the length of the displayed portion in the scroll direction is shorter than the predetermined length, the display controller 101 may cause the display device 473 to display a part or the whole of the scroll bar 30 so as to overlap with the keyboard, instead of restricting the display device 473 from displaying the upward arrow 31 and the downward arrow 32. In other words, the display controller 101 may either cause the display device 473 to (i) display the upward arrow 31 or downward arrow 32 so as to overlap with the keyboard, or (ii) display the entirety of the scroll bar 30 including the upward arrow 31 and the downward arrow 32, so as to overlap with the keyboard.

In this case, it is preferable that the display controller 101 secures the region for displaying a part or the whole of the scroll bar 30, and arranges the layout of the keys in advance. Alternatively, the display controller 101 may change the layout of the keyboard, when the scroll bar 30 is to be displayed on the keyboard, to thereby secure the region for displaying a part or the whole of the scroll bar 30.

Further, in the case where the length of the reduced displayed portion of the operation screen D1 in the scroll direction becomes shorter than the predetermined length, when the keyboard KB1 is superimposed on the operation screen D1 including the scroll bar 3 displayed thereon, the display controller 101 may restrict the display device 473 from displaying the scroll bar 30.

The disclosure may be modified in various manners, without limitation to the foregoing embodiments. Although the display apparatus according to the disclosure is applied to the image forming apparatus in the foregoing embodiment, this is merely an example. The display apparatus according to the disclosure may be applied to other types of electronic apparatus, such as medical equipment, a car navigation system, and a ticket-vending machine.

The configurations and processings described with reference to FIG. 1 to FIG. 11B are merely exemplary, and in no way intended to limit the disclosure to those configurations and processings.

While the present disclosure has been described in detail with reference to the embodiments thereof, it would be apparent to those skilled in the art the various changes and modifications may be made therein within the scope defined by the appended claims.

What is claimed is:

1. A display apparatus comprising:
a display device;
a touch panel overlaid on the display device;
and a control device including a processor, and configured to act as a display controller that controls a displaying operation of the display device, when the processor operates according to a control program, wherein the display controller causes the display device to:
display a portion of an operation screen including a character input field;
superimpose a keyboard on a first part of the displayed portion of the operation screen, when the touch panel receives a touch operation performed on the character input field, wherein the displayed portion of the operation screen is reduced by the superimposing of the keyboard;
determine whether a length of the reduced displayed portion of the operation screen is equal to or longer than a predetermined length;
determine whether the superimposed keyboard overlaps or does not overlap the character input field;
upon determining that the length of the reduced displayed portion of the operation screen is not equal to or longer than the predetermined length and upon determining that the superimposed keyboard overlaps the character input field, display a part or whole of a first scroll bar so as to overlap with the superimposed keyboard on the operation screen, wherein the first scroll bar is displayed along the full length of the reduced displayed portion in scroll directions of the first scroll bar, wherein the first scroll bar is displayed in a first vacant region not overlapping with the character input field.

2. The display apparatus according to claim 1, wherein the display controller, upon determining that the superimposed keyboard does not overlap the character input field, restricts the display device from displaying the first scroll bar, when causing the display device to display the keyboard.

3. The display apparatus according to claim 1, wherein the display controller sets a length of the first scroll bar to be displayed in the first vacant region, to a length proportional to an overall length of the operation screen.

4. The display apparatus according to claim 1, wherein the first scroll bar includes a first button for inputting an instruction to scroll in a predetermined first direction, and a second button for inputting an instruction to scroll in a second direction opposite to the first direction, and wherein the display controller causes the display device, upon determining that a size of the reduced display portion of the operation screen in the scroll direction is smaller than a predetermined size necessary for displaying the first button and the second button and upon determining that the superimposed keyboard overlaps the character input field, to display the first scroll bar including only one of the first button and the second button, or including neither, in the first vacant region.

5. The display apparatus according to claim 1, wherein, when the part or whole of the first scroll bar is to be displayed so as to overlap with the keyboard, the display controller secures a region for locating the part or whole of the first scroll bar, and changes a layout of keys of the keyboard.

6. An image forming apparatus comprising:
the display apparatus according to claim 1, and an image forming device that forms an image on a recording sheet.

7. The display apparatus according to claim 1, wherein the display controller, before superimposing the keyboard on the first part of the displayed portion of the operation screen, displays a second scroll bar on the displayed portion of the operation screen, and upon deciding that the length of the reduced displayed portion is equal to or longer than the predetermined length, generates a third scroll bar for scrolling the operation screen by reducing a length of the second scroll bar so as to fit in the reduced displayed portion of the operation screen, which is not hidden by the keyboard, wherein the second scroll bar is displayed along the full length of the displayed portion in scroll directions of the second scroll bar, and wherein the second and third scroll bars are displayed in a second and third vacant region not overlapping with the character input field.

* * * * *